UNITED STATES PATENT OFFICE.

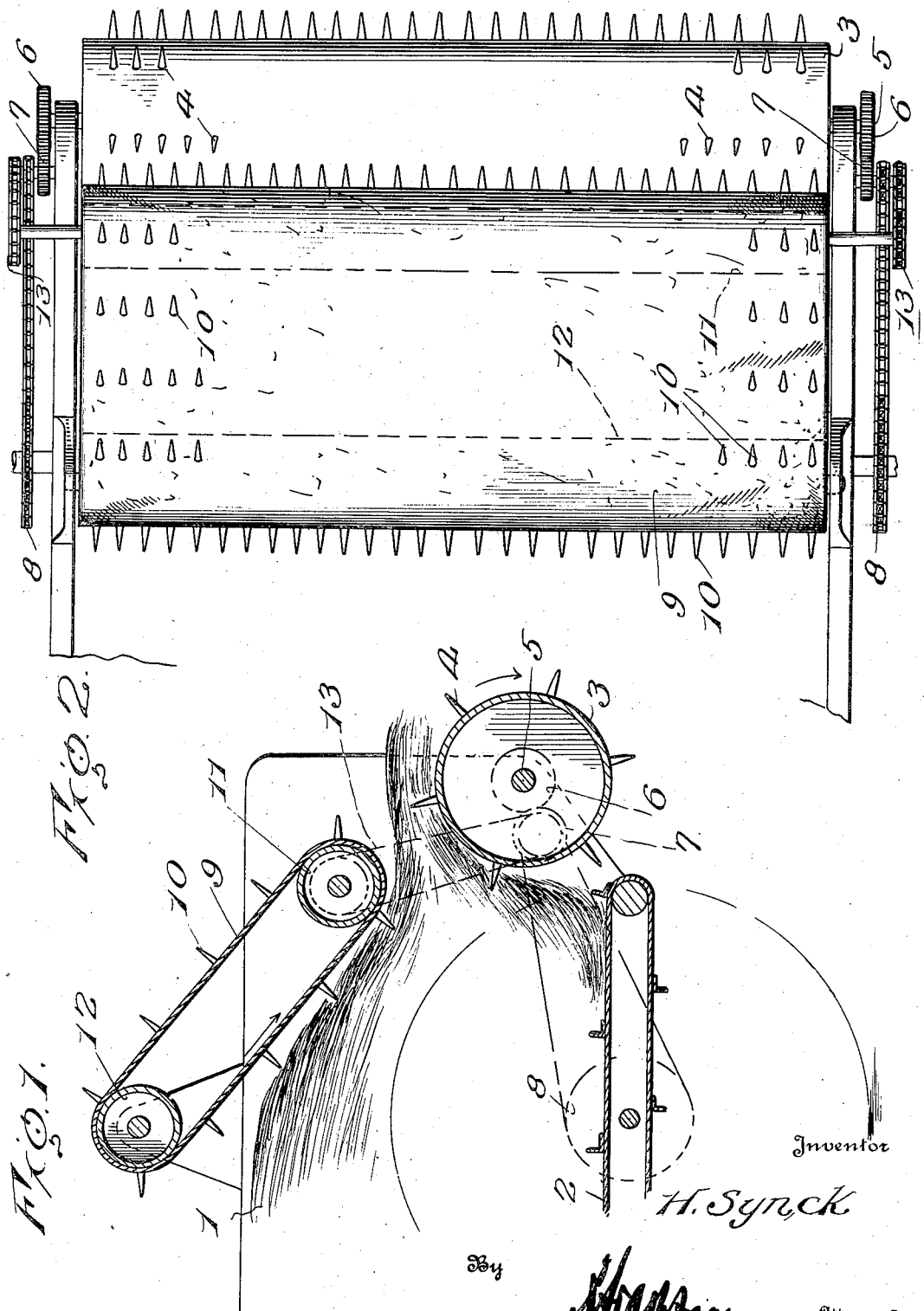

HENRY SYNCK, OF COLDWATER, OHIO, ASSIGNOR TO NEW IDEA SPREADER CO., OF COLDWATER, OHIO.

MANURE-SPREADER.

1,313,427.　　　Specification of Letters Patent.　　Patented Aug. 19, 1919.

Application filed October 10, 1917. Serial No. 195,764.

*To all whom it may concern:*

Be it known that I, HENRY SYNCK, a citizen of the United States, residing at Coldwater, in the county of Mercer and State of Ohio, have invented certain new and useful Improvements in Manure-Spreaders, of which the following is a specification.

This invention relates to manure spreaders and more particularly to an improvement in the pulverizing and feeding mechanism thereof. Ordinarily, mechanisms of this class embody a lower cylinder to which the material is gradually fed by a conveyer apron at the bottom of the wagon box and which, in its rotation, serves to distribute or spread the material and there is usually arranged above this cylinder a pulverizing and feeding cylinder which disintegrates the material and feeds the same to the said lower cylinder. This pulverizing cylinder is ordinarily comparatively small in diameter and as the material ordinarily contains a considerable quantity of long straws, these, in their wet condition, are liable to become wrapped about the small cylinder and thereby clog the same and interfere with the operation of the spreading mechanism. The present invention, therefore, has as its object to provide in lieu of the upper or pulverizing cylinder, a pulverizing and feeding device which will present to the material to be disintegrated a relatively large working area so that even though the material contains a number of long straws they will not be liable to clog the mechanism.

The pulverizing and feeding device of the present invention is preferably in the nature of an endless apron which is trained for travel over spaced rollers or drums and the invention contemplates so positioning and driving this apron that the lower stretch thereof will be inclined downwardly and rearwardly toward the upper side of the lower or spreading cylinder and will travel in such direction, the teeth or other elements upon the apron serving to disintegrate the material and at the same time feed the same on to the upper surface of the lower or spreading cylinder in such manner as to provide for even and thorough distribution of the material by the said lower cylinder.

In the accompanying drawings:—

Figure 1 is a vertical front to rear sectional view through the rear portion of a manure spreader embodying the mechanism of the present invention;

Fig. 2 is a top plan view thereof.

In the drawings, the numeral 1 indicates in general the wagon box of the spreader and 2 the usual endless conveyer apron which supports the load which is caused to slowly travel so as to move the load gradually rearwardly as it is fed from the box by the spreading mechanism. The lower or spreading cylinder is indicated in general by the numeral 3 and may be of any desired construction and is here illustrated as provided upon its surface with the usual teeth 4. The cylinder is preferably mounted upon a shaft 5 carrying a gear 6 which meshes with a pinion 7 upon a stub shaft upon one side of the box, this pinion being driven preferably by sprocket gearing 8 from one of the rear wheels of the spreader. It will be understood, of course, that various other arrangements of gearing may be provided so long as some means is employed for rotating the cylinder 3 in a rearward direction, or in other words, in the direction indicated by the arrow in Fig. 1 of the drawing.

The endless apron heretofore referred to as constituting an element of the means provided for pulverizing and feeding the material to the cylinder 3, is indicated by the numeral 9 and carries upon its outer surface transverse rows of teeth 10. The apron 9 is trained for travel over a lower roller or drum 11 and an upper roller or drum 12 and it is preferable that the lower drum 11 be driven by sprocket gearing 13 from the pinion 7 or the stub shaft upon which the pinion is mounted. The drum 11 is located a suitable distance above and toward the front of the cylinder 3 and the drum 12 is located above and forwardly of the drum 11 so that the lower stretch of the apron 9, which stretch is caused to travel downwardly and rearwardly, as indicated by the arrow in Fig. 1, will occupy an inclined plane located above the axis of the cylinder 3. Therefore, as the fertilizer is fed to the cylinder 3 by the lower stretch of the apron 9, it will be disintegrated by the teeth 10 and will be delivered to the upper side of the said cylinder 3 where it may be more efficiently acted upon by the teeth 4 upon the said cylinder. By reason of the construction and arrangement of the pulverizing and feeding device just described, long straws in the disintegration of the material will be caused to string along beneath the working stretch of the apron 9 until engaged by the teeth 4 and, therefore, the mechanism will not be liable to become clogged thereby.

Having thus described the invention, what is claimed as new is:

1. In mechanism of the class described, the combination with a feed conveyer, of a lower distributing cylinder having its major portion disposed in a plane above the upper surface of the rear end of the conveyer, means for rearwardly rotating the cylinder, and an endless traveling apron having a working stretch positioned to travel downwardly and rearwardly into coöperative relation with the upper portion of said cylinder.

2. In mechanism of the class described, the combination with a feed conveyer, of a lower horizontally disposed distributing cylinder having its axis of rotation disposed in a plane above the upper surface of the rear end of the conveyer, means for rearwardly rotating the distributing cylinder, and an endless traveling apron having a lower working stretch occupying a plane inclined downwardly and rearwardly and lying wholly above the axis of the distributing cylinder with its delivery end coöperating with said cylinder, said plane passing through the upper side of said cylinder, and means for driving the apron to cause the lower stretch to travel in a downward and rearward direction.

3. In mechanism of the class described, the combination with an endless feed conveyer, of a lower distributing cylinder located in a plane substantially above the upper stretch of the rear end of the conveyer, means for rotating the cylinder in a rearward direction, an endless traveling apron, drums about which the apron is passed, one of said drums being located above and forwardly of said distributing cylinder, and the other drum being located above and forwardly of the first mentioned drum, whereby the lower stretch of said apron will travel in a downwardly and rearwardly inclined plane and coöperate with the upper and forward side of the distributing cylinder, disintegrating elements upon said apron, and means for imparting rotary movement to one of said drums for rotating the apron to cause the lower stretch thereof to travel in a downward and rearward direction.

4. In mechanism of the class described, the combination with a wagon body including a shaft and an endless feed conveyer trained about said shaft, of a lower distributing cylinder journaled between the side walls of the wagon body and having its major portion disposed in a plane above the upper stretch of the endless conveyer, spaced rotating drums disposed forwardly of the distributing cylinder, the axis of rotation of one of said drums being disposed above and in substantially vertical alinement with the axis of rotation of said conveyer shaft, an endless apron traveling around said drums and having its discharge end spaced forwardly of the axis of rotation of the cylinder and coöperating with said cylinder, means for rotating the cylinder in a rearward direction, and means for rotating the drums to cause the lower stretch of the apron to travel in a downward and rearward direction.

In testimony whereof I affix my signature.

HENRY SYNCK. [L. S.]